(12) United States Patent
Futae et al.

(10) Patent No.: US 11,784,517 B2
(45) Date of Patent: Oct. 10, 2023

(54) ROTARY ELECTRIC MACHINE WITH VIBRATION AND NOISE REDUCTION

(71) Applicant: MITSUBISHI HEAVY INDUSTRIES ENGINE & TURBOCHARGER, LTD., Sagamihara (JP)

(72) Inventors: Takaya Futae, Tokyo (JP); Shunsuke Yakushiji, Tokyo (JP); Naomichi Shibata, Sagamihara (JP); Byeongil An, Sagamihara (JP); Takaaki Yoshizawa, Sagamihara (JP)

(73) Assignee: MITSUBISHI HEAVY INDUSTRIES ENGINE & TURBOCHARGER, LTD., Sagamihara (JP)

(*) Notice: Subject to any disclaimer, the term of this patent is extended or adjusted under 35 U.S.C. 154(b) by 552 days.

(21) Appl. No.: 17/041,254

(22) PCT Filed: May 15, 2018

(86) PCT No.: PCT/JP2018/018677
§ 371 (c)(1),
(2) Date: Sep. 24, 2020

(87) PCT Pub. No.: WO2019/220523
PCT Pub. Date: Nov. 21, 2019

(65) Prior Publication Data
US 2021/0013752 A1    Jan. 14, 2021

(51) Int. Cl.
*H02K 1/18* (2006.01)
*H02K 1/20* (2006.01)
(Continued)

(52) U.S. Cl.
CPC .............. *H02K 1/185* (2013.01); *H02K 1/20* (2013.01); *H02K 5/203* (2021.01); *H02K 5/24* (2013.01); *H02K 9/193* (2013.01)

(58) Field of Classification Search
CPC  H02K 1/185; H02K 1/18; H02K 1/20; H02K 5/203; H02K 5/20; H02K 5/24; H02K 9/193; H02K 9/197; H02K 9/19
See application file for complete search history.

(56) References Cited

U.S. PATENT DOCUMENTS

| 6,320,287 | B1 | 11/2001 | Watson et al. |
| 6,798,094 | B2 | 9/2004 | Hirsou et al. |
| 10,658,889 | B2 * | 5/2020 | Tran ........................ H02K 5/203 |

FOREIGN PATENT DOCUMENTS

| CN | 104335453 A | 2/2015 |
| JP | 62-214285 A | 9/1987 |

(Continued)

OTHER PUBLICATIONS

International Search Report, dated Aug. 14, 2018, for International Application No. PCT/JP2018/018677, with an English translation.
(Continued)

*Primary Examiner* — Emily P Pham
(74) *Attorney, Agent, or Firm* — Birch, Stewart, Kolasch & Birch, LLP

(57) ABSTRACT

A rotary electric machine includes a housing, a stator disposed in the housing, and at least two support members disposed in at least two different parts, respectively, in an axial direction of the stator between the housing and an outer circumferential surface of the stator, the at least two support members supporting the stator against the housing. The at least two support members, the housing, and the outer circumferential surface of the stator form a space.

3 Claims, 7 Drawing Sheets

(51) Int. Cl.
    *H02K 5/24*      (2006.01)
    *H02K 9/193*     (2006.01)
    *H02K 5/20*      (2006.01)

(56) References Cited

FOREIGN PATENT DOCUMENTS

| | | |
|---|---|---|
| JP | 7-264810 A | 10/1995 |
| JP | 2006-170379 A | 6/2006 |
| JP | 2006-254530 A | 9/2006 |
| JP | 4092195 B2 | 5/2008 |
| JP | 2015-82897 A | 4/2015 |
| WO | WO 2013/182338 A2 | 12/2013 |

OTHER PUBLICATIONS

Written Opinion of the International Searching Authority, dated Sep. 23, 2020, for International Application No. PCT/JP2018/018677, with an English translation.
Extended European Search Report dated Jan. 26, 2021 issued to the corresponding European Application No. 18918483.1.
Chinese Office Action dated Aug. 2, 2022 issued in counterpart Chinese Application No. 201880086969.1 with an English Translation.
Office Action dated Jan. 5, 2022 issued in counterpart Chinese Application No. 201880086969.1 with an English Translation.

* cited by examiner

ROTARY ELECTRIC MACHINE WITH VIBRATION AND NOISE REDUCTION

TECHNICAL FIELD

The present disclosure relates to a rotary electric machine.

BACKGROUND

A turbocharger is known as a device for improving acceleration performance of an engine. However, in the turbocharger, a time lag (turbo lag) until supercharging is started at the time of acceleration is caused. As a countermeasure to the above, an electric compressor is used.

As one of problems of the electric compressor, noise is given. The noise is considered to be made by a vibration of a housing due to a motor. Thus, it is considered that the noise can be reduced, as long as a stator can gently be supported against a housing, instead of firmly fixing the stator to the housing.

Patent Document 1 discloses a motor in which a stator is gently supported against a housing. In the motor, the stator is supported in the axial direction by an expandable member, and the stator is supported in the radial direction by a thermally conductive resin.

CITATION LIST

Patent Literature

Patent Document 1: JP4092195B

SUMMARY

Technical Problem

However, in the motor described in Patent Document 1, the problem arises in that there are many support parts, as well as the shape of the expandable member is complicated.

In view of the above, an object of at least one embodiment of the present disclosure is to provide a rotary electric machine capable of reducing noise with a simple configuration.

Solution to Problem (1) A rotary electric machine according to at least one embodiment of the present invention includes a housing, a stator disposed in the housing, and at least two support members disposed in at least two different parts, respectively, in an axial direction of the stator between the housing and an outer circumferential surface of the stator, the at least two support members supporting the stator against the housing. The at least two support members, the housing, and the outer circumferential surface of the stator form a space.

With the above configuration (1), since the at least two support members are disposed in the two different parts, respectively, in the axial direction of the stator between the housing and the outer circumferential surface of the stator to support the stator against the housing, it is possible to gently support the stator against the housing with the simple configuration. Consequently, a vibration transmitted from the stator to the housing is reduced, making it possible to reduce noise.

(2) In some embodiments, in the above configuration (1), a cooling fluid flows in the space.

With the above configuration (2), since the stator is cooled by the cooling fluid flowing in the space formed by the at least two support members, the housing, and the outer circumferential surface of the stator, it is possible to suppress performance degradation due to heat generation by the rotary electric machine.

(3) In some embodiments, in the above configuration (2), the at least two support members are annular seal members separate from the housing and the stator.

With the above configuration (3), it is possible to reduce leakage of the cooling fluid from the space by the seal members.

(4) In some embodiments, in the above configuration (2) or (3), the stator includes a stator core, and a protective member disposed so as to cover an outer circumferential surface of the stator core, and the outer circumferential surface of the protective member constitutes the outer circumferential surface of the stator.

The stator core is formed by laminating a plurality of annular steel plates. Thus, the cooling fluid may leak via a gap between the adjacent steel plates, if the cooling fluid flows in the above-described space. However, with the above configuration (4), since the outer circumferential surface of the stator core is covered with the protective member, it is possible to prevent the cooling fluid from leaking via the gap between the adjacent steel plates.

(5) In some embodiments, in any one of the above configurations (1) to (4), the rotary electric machine further includes a moving constraint mechanism for constraining movement of at least one of the at least two support members in the axial direction of the stator.

If the support members can move freely in the axial direction of the stator, the support members may deviate when the stator is mounted in the housing, taking trouble in installing the support members in appropriate parts respectively, or the support members may move in the axial direction of the stator by a vibration during operation of the rotary electric machine. However, with the above configuration (5), since the moving constraint mechanism can constrain the support members in the axial direction of the stator, it is possible to easily mount the stator in the housing or to reduce the movement of the support members due to the vibration during the operation of the rotary electric machine.

(6) In some embodiments, in the above configuration (1), at least one of the at least two support members is a protruding portion formed integrally with one of the housing or the outer circumferential surface of the stator so as to protrude from the one of the housing or the outer circumferential surface of the stator toward the other of the housing or the outer circumferential surface of the stator.

With the above configuration (6), since the support member is formed integrally with the housing or the stator, it is possible to gently support the stator against the housing just by mounting the stator in the housing. Thus, it is possible to improve assembly workability of the rotary electric machine.

(7) In some embodiments, in the above configuration (6), the protruding portion is divided into at least three members to be spaced apart from each other in a circumferential direction of the outer circumferential surface of the stator.

With the above configuration (7), since the support member, which is configured such that the protruding portion is divided into the at least three members to be spaced apart from each other in the circumferential direction of the outer circumferential surface of the stator, supports the stator against the housing, it is possible to support the stator more gently than in the case in which the support member composed of the protruding portion of the annular shape is used.

Advantageous Effects

According to at least one embodiment of the present disclosure, since the at least two support members are disposed in the two different parts, respectively, in the axial direction of the stator between the housing and the outer circumferential surface of the stator to support the stator against the housing, it is possible to gently support the stator against the housing with the simple configuration. Consequently, a vibration transmitted from the stator to the housing is reduced, making it possible to reduce noise.

DETAILED DESCRIPTION

Embodiments of the present invention will now be described in detail with reference to the accompanying drawings. However, the scope of the present invention is not limited to the following embodiments. It is intended that dimensions, materials, shapes, relative positions and the like of components described in the embodiments shall be interpreted as illustrative only and not intended to limit the scope of the present invention.

Embodiment 1

Figure 1:
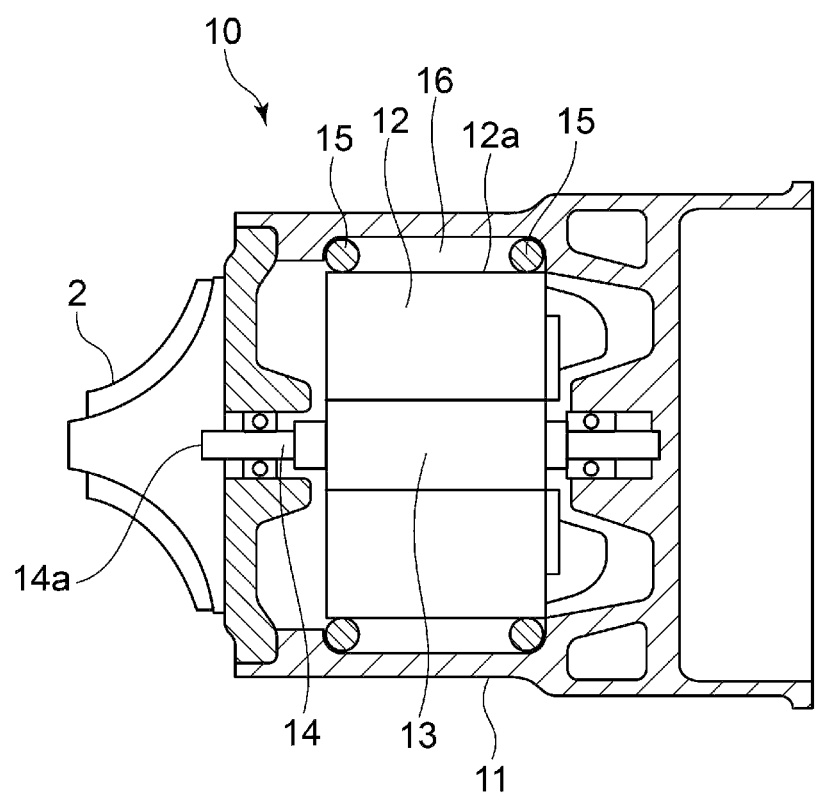
FIG. 1 is a cross-sectional view of a rotary electric machine according to Embodiment 1 of the present disclosure.

FIG. 1 shows a cross-section of an electric compressor 1 including a motor 10 which is a rotary electric machine according to Embodiment 1 of the present disclosure. The motor 10 includes a housing 11, a stator 12 supported against the housing 11 with a configuration to be described later in the housing 11, and a rotor 13 disposed to be rotatable with respect to the stator 12 in the housing 11. The rotor 13 is fixed to a rotational shaft 14 supported to be rotatable with respect to the housing 11. The rotational shaft 14 has one end part 14a protruding outside from the inside of the housing 11. An impeller 2 is fixed to the end part 14a of the rotational shaft 14.

Between the housing 11 and an outer circumferential surface 11a of the stator 12, O-rings 15 serving as support members are disposed in two different parts, respectively, in the axial direction of the stator 12. Each of the O-rings 15 abuts on the housing 11 and the outer circumferential surface 12a of the stator 12, thereby supporting the stator 12 against the housing 11. The two O-rings 15, the housing 11, and the outer circumferential surface 12a of the stator 12 form a space 16 of a cylindrical shape along the circumferential direction of the outer circumferential surface 12a of the stator 12.

In a case of a configuration in which the entire or large part of the outer circumferential surface 12a of the stator 12 contacts the housing 11, thereby supporting the stator 12 against the housing 11 (to be referred to as a comparative configuration hereinafter), since the stator 12 is supported so as to be firmly fixed to the housing 11, a vibration caused by operating the motor 10 tends to be directly transmitted from the stator 12 to the housing 11 with little damping. Noise is considered to be made due to such vibration transmission to the housing 11.

By contrast, in the motor 10 according to Embodiment 1, the stator 12 is supported against the housing 11 with the O-rings 15 disposed in the two different parts, respectively, in the axial direction of the stator 12. In this case, since the stator 12 is not firmly fixed to the housing 11, the stator 12 is gently supported against the housing 11, as compared with the above-described comparative configuration. Thus, the vibration caused by operating the motor 10 is transmitted from the stator 12 to the housing 11 while being damped. That is, since the vibration transmitted from the stator 12 to the housing 11 in the motor 10 is reduced as compared with the vibration transmitted in the above-described comparative configuration, noise is reduced in the motor 10 according to Embodiment 1 as compared with the above-described comparative configuration.

Thus, since the O-rings 15 are disposed in the two different parts, respectively, in the axial direction of the stator 12 between the housing 11 and the outer circumferential surface 12a of the stator 12 to support the stator 12 against the housing 11, it is possible to gently support the stator 12 against the housing 11 with the simple configuration. Consequently, since the vibration transmitted from the stator 12 to the housing 11 is reduced, it is possible to reduce noise.

In Embodiment 1, the two O-rings 15 are provided. However, not less than three O-rings 15 may be provided. If the stator 12 is to be supported only with the one O-ring 15, the stator 12 is inclined with the O-ring 15 as a fulcrum. However, it is possible to gently support the stator 12 against the housing 11 without any inclination by supporting the stator 12 with at least two O-rings 15 in at least two different parts, respectively, in the axial direction of the stator 12.

Moreover, in Embodiment 1, the O-rings 15 are used as the support members. However, the present invention is not limited thereto. The space 16 can be sealed in the axial direction of the stator 12, if the annular O-rings 15 are used. However, support members each configured to have a portion partially along the circumferential direction of the outer circumferential surface 12a of the stator 12, for example, C-rings can also be used, if the space 16 need not be sealed.

Embodiment 2

Next, the rotary electric machine according to Embodiment 2 will be described. The rotary electric machine according to Embodiment 2 is obtained by adding, to Embodiment 1, a mechanism for cooling the stator 12. In Embodiment 2, the same constituent elements as those in Embodiment 1 are associated with the same reference characters and not described again in detail.

Figure 2:
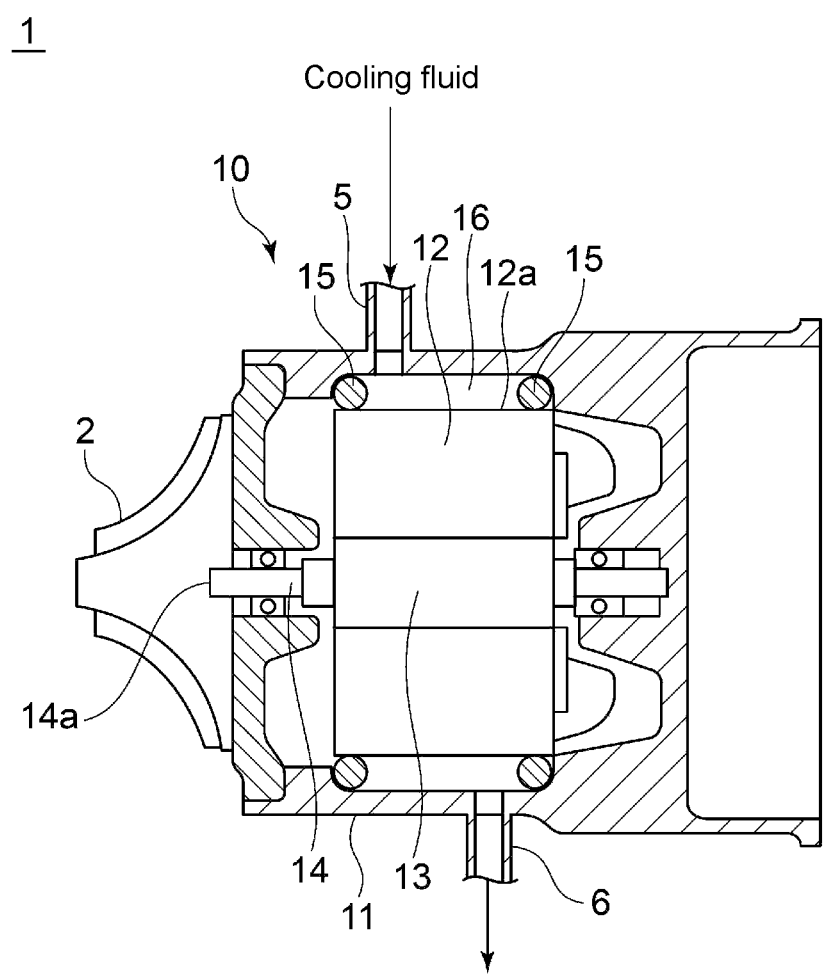
FIG. 2 is a cross-sectional view of the rotary electric machine according to Embodiment 2 of the present disclosure.

As shown in FIG. 2, the space 16 is sealed in the axial direction of the stator 12 with the two O-rings 15. In the housing 11, an inflow passage 5 and an outflow passage 6 are disposed so as to communicate with the space 16. A cooling fluid such as water or oil flows in the space 16 via the inflow passage 5 and flows out of the space 16 via the outflow passage 6. Other configurations are the same as Embodiment 1.

In Embodiment 2 as well, since the stator 12 is gently supported against the housing 11 with the two O-rings 15, it is possible to obtain an effect of reducing noise as in Embodiment 1. In addition, in Embodiment 2, since the stator 12 is cooled by the cooling fluid flowing in the space 16, it is possible to suppress performance degradation due to heat generation by the motor 10. Furthermore, in Embodiment 2, since the space 16 formed by the two O-rings 15, the housing 11, and the outer circumferential surface 12a of the stator 12 is used as a passage for the cooling fluid, there is no need to form a passage for the cooling fluid in the housing 11. Thus, it is possible to simplify the configuration of the housing 11 and to suppress an increase in manufacturing cost of the housing 11.

Figure 3:
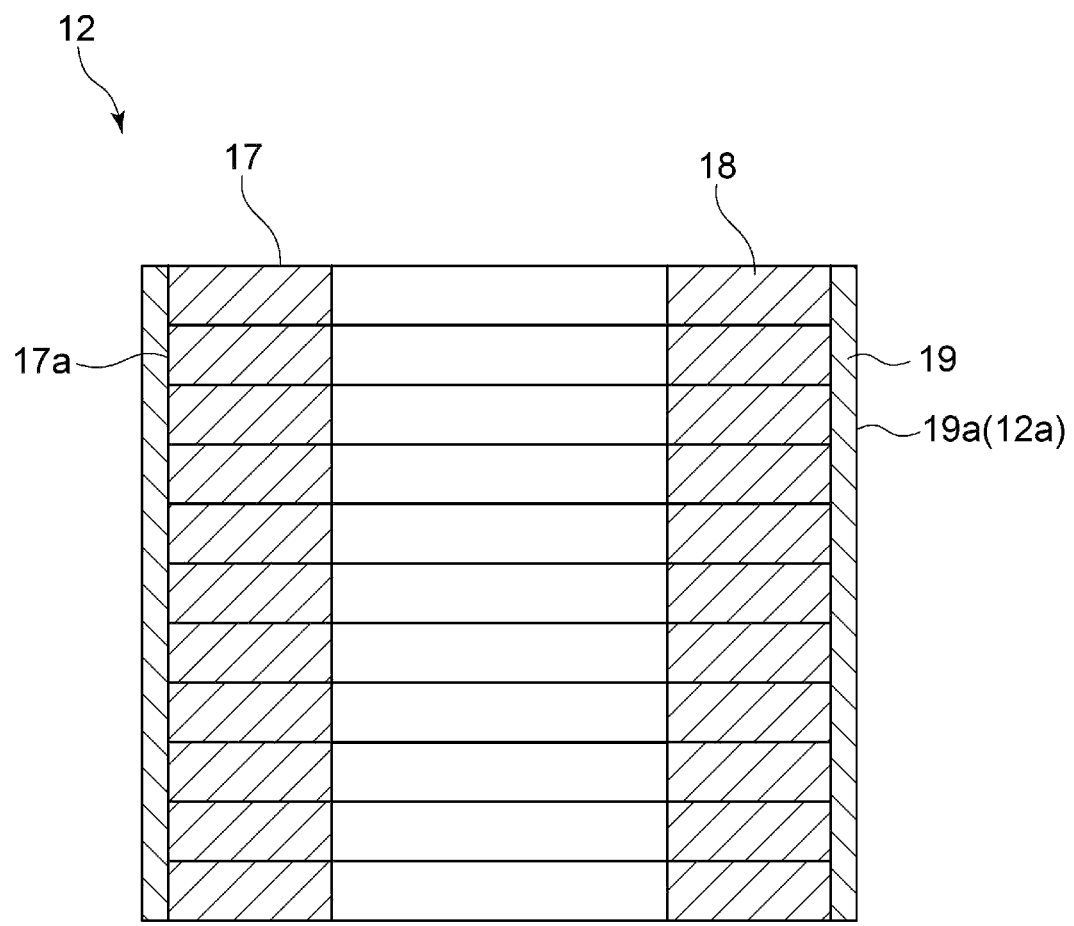
FIG. 3 is a partial cross-sectional view of a modified example of a stator for the rotary electric machine according to Embodiment 2 of the present disclosure.

As shown in FIG. 3, a stator core 17 of the stator 12 normally has a cylindrical shape formed by laminating a plurality of annular steel plates 18. Thus, the cooling fluid may leak toward the rotor 13 (see FIG. 2) via a gap between the adjacent steel plates 18, if the cooling fluid flows in the space 16 (see FIG. 2). Therefore, the stator 12 may be composed of the stator core 17, and a protective member 19 of a cylindrical shape disposed so as to cover an outer circumferential surface 17a of the stator core 17. With the protective member 19, it is possible to prevent the cooling fluid flowing in the space 16 from leaking toward the rotor 13 via the gap between the adjacent steel plates 18. In this case, an outer circumferential surface 19a of the protective member 19 constitutes the outer circumferential surface 12a of the stator 12.

Embodiment 3

Next, the rotary electric machine according to Embodiment 3 will be described. The rotary electric machine according to Embodiment 3 is obtained by adding, to each of Embodiments 1 and 2, a moving constraint mechanism for constraining movement of the O-rings 15 in the axial direction of the stator 12. Embodiment 3 will be described below with a configuration obtained by adding the moving constraint mechanism to the configuration of Embodiment 1. However, Embodiment 3 may be configured by adding the moving constraint mechanism to the configuration of Embodiment 2. In Embodiment 2, the same constituent elements as those in Embodiment 1 are associated with the same reference characters and not described again in detail.

Figure 4:
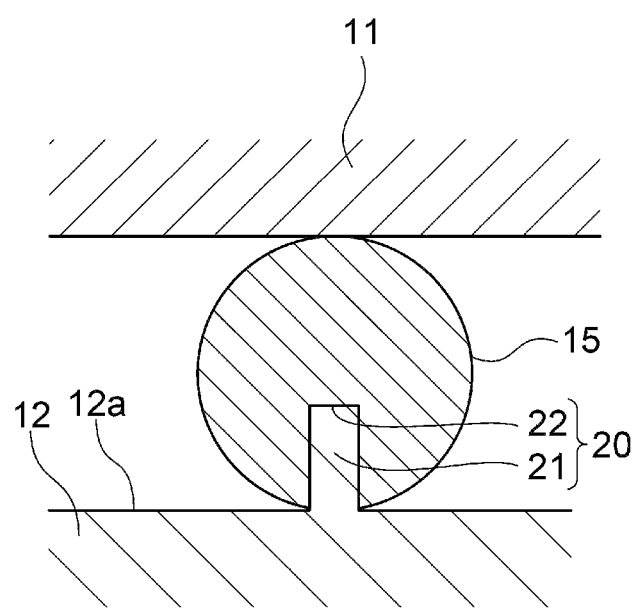
FIG. 4 is a partial cross-sectional view of the rotary electric machine according to Embodiment 3 of the present disclosure.

As shown in FIG. 4, the motor 10 (see FIG. 1) includes a moving constraint mechanism 20 for constraining movement of the O-rings 15 in the axial direction of the stator 12. The moving constraint mechanism 20 is composed of an annular insertion member 21 and an insertion groove 22. The insertion member 21 is formed so as to protrude from the outer circumferential surface 12a of the stator 12. The insertion groove 22 is formed in the O-ring 15 so as to allow insertion of the insertion member 21. The insertion member 21 is inserted into the insertion groove 22, constraining the O-ring 15 in the axial direction of the stator 12. Other configurations are the same as Embodiment 1.

If the O-ring 15 can move freely in the axial direction of the stator 12, the O-ring 15 may deviate when the stator 12 is mounted in the housing 11, taking trouble in installing the O-ring 15 in an appropriate part, or the O-ring 15 may move in the axial direction of the stator 12 by the vibration during the operation of the motor 10. However, in Embodiment 3, since the moving constraint mechanism 20 can constrain the O-ring 15 in the axial direction of the stator 12, it is possible to easily mount the stator 12 in the housing 11 or to reduce the movement of the O-ring 15 due to the vibration during the operation of the motor 10.

FIG. 4 is drawn such that only the one O-ring 15 is constrained by the moving constraint mechanism 20 in the axial direction of the stator 12. However, the moving constraint mechanism 20 may be provided to constrain each of the two O-rings 15 in the axial direction of the stator 12. Moreover, if not less than three O-rings 15 are disposed, the moving constraint mechanism 20 may be provided to constrain all the two O-rings 15 in the axial direction of the stator 12, or the moving constraint mechanism 20 may be provided to constrain some of the O-rings 15 in the axial direction of the stator 12.

Figure 5:
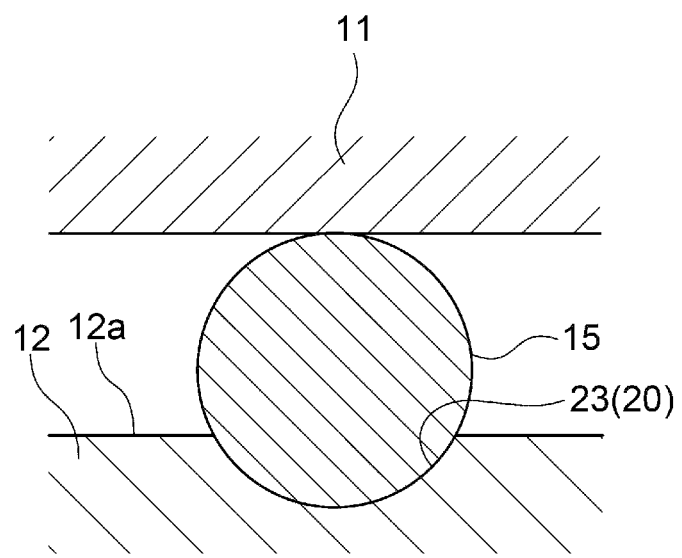
FIG. 5 is a partial cross-sectional view of a modified example of the rotary electric machine according to Embodiment 3 of the present disclosure.

In Embodiment 3, the moving constraint mechanism 20 is composed of the insertion member 21 formed in the stator 12 and the insertion groove 22 formed in the O-ring 15. However, the present invention is not limited to this configuration. For example, as shown in FIG. 5, the moving constraint mechanism 20 may be composed of an accommodation groove 23 capable of accommodating the O-ring 15 formed along the circumferential direction of the outer circumferential surface 12a of the stator 12. Since the O-ring 15 is accommodated in the accommodation groove 23, it is possible to constrain the O-ring 15 in the axial direction of the stator 12. With this configuration, it is possible to configure the moving constraint mechanism 20 only by forming the accommodation groove 23 in the outer circumferential surface 12a of the stator 12. Thus, it is possible to simplify the configuration and also to reduce the manufacturing cost of the motor 10, as compared with the moving constraint mechanism 20 configured as shown in FIG. 4. In a case in which the protective member 19 is provided for the stator 12, the insertion member 21 and the accommodation groove 23 of the moving constraint mechanism 20 are formed in the protective member 19.

Embodiment 4

Next, the rotary electric machine according to Embodiment 4 will be described. The rotary electric machine according to Embodiment 4 is obtained by modifying Embodiment 1 in the configuration of the support member. In Embodiment 4, the same constituent elements as those in Embodiment 1 are associated with the same reference characters and not described again in detail.

Figure 6:
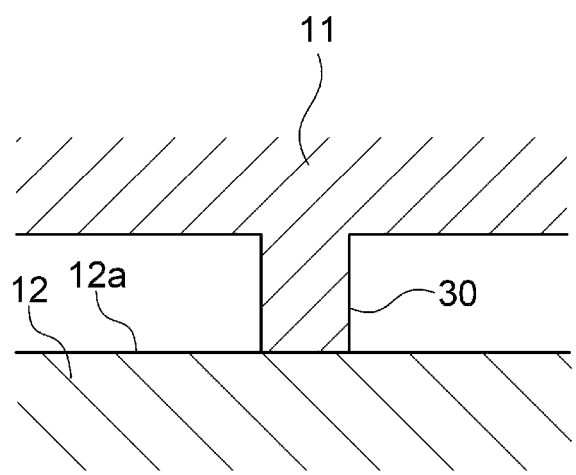
FIG. 6 is a partial cross-sectional view of the rotary electric machine according to Embodiment 4 of the present disclosure.

As shown in FIG. 6, each of two support members (FIG. 6 illustrates only one support member) for supporting the stator 12 against the housing 11 is a protruding portion 30 of an annular shape formed integrally with the housing 11 so as to protrude toward the outer circumferential surface 12a of the stator 12 from the housing 11. The outer circumferential surface 12a of the stator 12 abuts on the protruding portion 30, thereby supporting the stator 12 against the housing 11. Other configurations are the same as Embodiment 1.

It is also possible to support the stator 12 against the housing 11 more gently than in the comparative configuration described in Embodiment 1 by supporting the stator 12 against the housing 11 with the two protruding portions 30 each having the annular shape and formed integrally with the housing 11. Thus, the vibration transmitted from the stator 12 to the housing 11 is reduced, making it possible to reduce noise.

Moreover, in Embodiment 4, since the protruding portions 30 are formed integrally with the housing 11, it is possible to gently support the stator 12 against the housing 11 just by mounting the stator 12 in the housing 11. Thus, it is possible to improve assembly workability of the motor 10.

In Embodiment 4, the protruding portions 30 are formed integrally with the housing 11. However, the present invention is not limited to this configuration. The protruding portions 30 may be formed integrally with the stator 12 so as to protrude from the outer circumferential surface 12*a* of the stator 12 toward the housing 11.

In Embodiment 4, both the two support members are the protruding portions 30. However, one of the support member may be the protruding portion 30, and the other may be a support member separate from the housing 11 and the stator, such as the O-ring 15 (see FIG. 1). Moreover, if not less than three support members are provided, at least one of the support members may be the protruding portion 30. Furthermore, if the plurality of protruding portions 30 are provided, some of the protruding portions 30 may be formed integrally with the housing 11, and the rest of the protruding portions 30 may be formed integrally with the stator 12.

Figure 7:
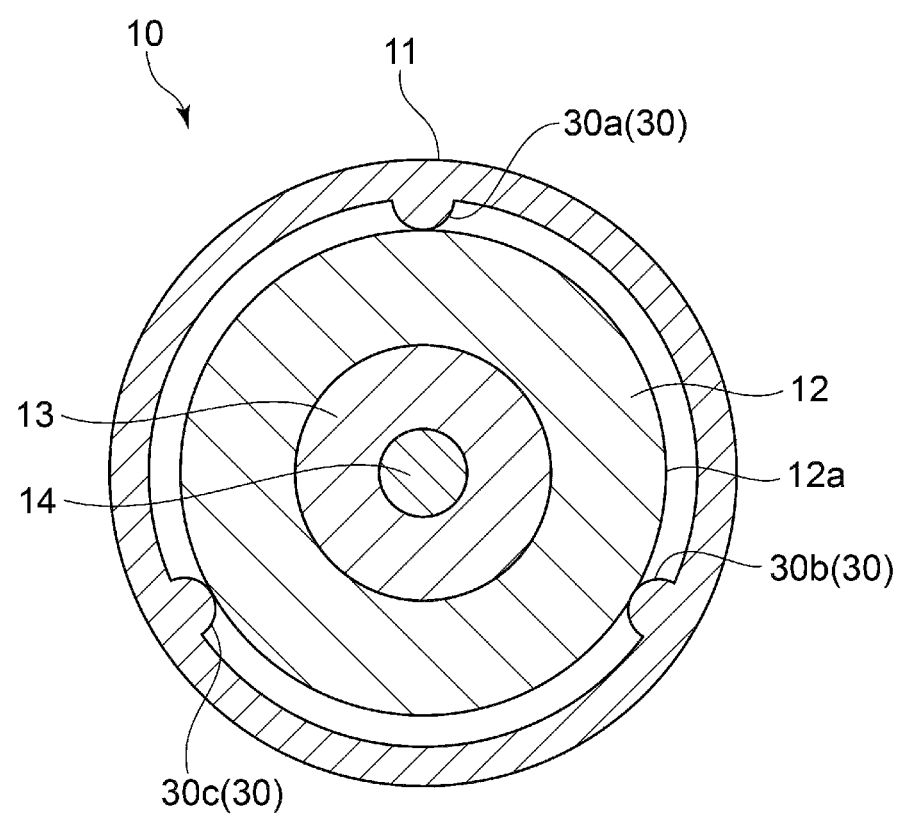
FIG. 7 is a partial cross-sectional view of a modified example of the rotary electric machine according to Embodiment 4 of the present disclosure.

In Embodiment 4, the protruding portions 30 each have the annular shape. However, the present invention is not limited to this shape. As shown in FIG. 7, the protruding portion 30 may be configured to be divided into three members 30*a*, 30*b*, 30*c* to be spaced apart from each other in the circumferential direction of the outer circumferential surface 12*a* of the stator 12. With the above configuration, it is possible to support the stator 12 more gently than in the case in which the support member composed of protruding portion 30 of the annular shape is used. The protruding portion 30 may be configured to be divided into not less than four members.

In each of Embodiments 1 to 4, the rotary electric machine is described as the motor 10 for the electric compressor 1. However, the present invention is not limited to this configuration. The rotary electric machine may be of any form, as long as the rotary electric machine is configured such that the stator is supported against the housing in the housing. The rotary electric machine may be a generator or a motor used for any usage.

REFERENCE SIGNS LIST

1 Electric compressor
2 Impeller
5 Inflow passage
6 Outflow passage
10 Motor
11 Housing
12 Stator
12*a* Outer circumferential surface (of stator)
13 Rotor
14 Rotational shaft
14*a* End part (of rotational shaft)
15 O-ring (support member)
16 Space
17 Stator core
17*a* Outer circumferential surface (of stator core)
18 Steel plate
19 Protective member
19*a* Outer circumferential surface (of protective member)
20 Moving constraint mechanism
21 Insertion member
22 Insertion groove
23 Accommodation groove
30 Protruding portion (support member)
30*a* Member (composing protruding portion)
30*b* Member (composing protruding portion)
30*c* Member (composing protruding portion)

The invention claimed is:

1. A rotary electric machine comprising:
a housing;
a stator disposed in the housing;
at least two support members disposed in at least two different places, respectively, in an axial direction of the stator between the housing and an outer circumferential surface of the stator, the at least two support members supporting the stator against the housing; and
a moving constraint mechanism for constraining movement of at least one of the at least two support members in the axial direction of the stator,
wherein the at least two support members, the housing, and the outer circumferential surface of the stator form a space, and
wherein the at least two support members are annular seal members separate from the housing and the stator, and the moving constraint mechanism includes an annular insertion member and an insertion groove, the annular insertion member being formed so as to protrude from the outer circumferential surface of the stator, the insertion groove being formed in the at least one of the at least two support members so as to allow insertion of the insertion member.

2. The rotary electric machine according to claim 1, wherein a cooling fluid flows in the space.

3. The rotary electric machine according to claim 2, wherein the stator includes:
a stator core; and
a protective member disposed so as to cover an outer circumferential surface of the stator core, and
wherein the outer circumferential surface of the protective member constitutes the outer circumferential surface of the stator.

* * * * *